United States Patent
Liu et al.

(10) Patent No.: US 11,330,634 B2
(45) Date of Patent: May 10, 2022

(54) METHOD FOR SENDING RANDOM ACCESS PREAMBLE, METHOD FOR RECEIVING RANDOM ACCESS PREAMBLE, AND APPARATUS

(71) Applicant: Huawei Technologies Co., Ltd., Shenzhen (CN)

(72) Inventors: Zhe Liu, Shanghai (CN); Hao Tang, Shanghai (CN); Fan Wang, Berkshire (GB); Guohua Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 16/786,512

(22) Filed: Feb. 10, 2020

(65) Prior Publication Data
US 2020/0178316 A1  Jun. 4, 2020

Related U.S. Application Data

(63) Continuation of application No. PCT/CN2018/095741, filed on Jul. 16, 2018.

(30) Foreign Application Priority Data

Aug. 11, 2017 (CN) .......................... 201710686829.5

(51) Int. Cl.
*H04W 72/04* (2009.01)
*H04W 74/08* (2009.01)

(52) U.S. Cl.
CPC ..... *H04W 74/0833* (2013.01); *H04W 72/042* (2013.01)

(58) Field of Classification Search
CPC ............... H04W 72/04; H04W 72/042; H04W 72/0833; H04W 72/0858; H04W 72/0866; H04W 72/14
See application file for complete search history.

(56) References Cited

U.S. PATENT DOCUMENTS

| 10,015,725 B2 | 7/2018 | Lee et al. |
| 10,932,182 B2 | 2/2021 | Pantelidou |

(Continued)

FOREIGN PATENT DOCUMENTS

| CN | 101998294 A | 3/2011 |
| CN | 103249168 A | 8/2013 |

(Continued)

OTHER PUBLICATIONS

"Discussion on RACH Configuration," Source: CMCC, Agenda Item: 5.1.1.4.4, Document for: Discussion and Decision, 3GPP TSG RAN WG1 Meeting NR Adhoc, R1-1710774, Jun. 27-30, 2017, 4 pages.

(Continued)

*Primary Examiner* — Chi Ho A Lee
(74) *Attorney, Agent, or Firm* — Slater Matsil, LLP

(57) ABSTRACT

A method for receiving a random access preamble includes: sending, by a network device, a broadcast message, where the broadcast message is used to configure an NR uplink resource and an SUL resource, and the NR uplink resource and the SUL resource are used to send a random access preamble; sending, by the network device, first indication information and second indication information to a terminal device, where the first indication information is used to indicate the NR uplink resource or the SUL resource, and second indication information is used to indicate a first random access preamble; and receiving, by the network device, the first random access preamble on the resource indicated by the first indication information.

15 Claims, 3 Drawing Sheets

(56) References Cited

U.S. PATENT DOCUMENTS

| | | | |
|---|---|---|---|
| 2010/0135259 A1 | 6/2010 | Lee et al. | |
| 2011/0007825 A1 | 1/2011 | Hao et al. | |
| 2011/0116485 A1 | 5/2011 | Olszewski et al. | |
| 2014/0079002 A1* | 3/2014 | Chen | H04W 74/0833 370/329 |
| 2015/0222401 A1 | 8/2015 | Xu et al. | |
| 2016/0302176 A1* | 10/2016 | Ahn | H04L 1/1896 |
| 2017/0346535 A1* | 11/2017 | Islam | H04B 7/0617 |
| 2018/0255585 A1* | 9/2018 | Tirronen | H04W 74/0866 |
| 2019/0044659 A1* | 2/2019 | Aln | H04W 74/0858 |
| 2019/0053080 A1* | 2/2019 | Ryu | H04L 5/0053 |
| 2019/0165905 A1* | 5/2019 | Kim | H04L 5/0053 |
| 2019/0222402 A1* | 7/2019 | Yang | H04W 72/14 |
| 2020/0371960 A1* | 11/2020 | Bhoria | G06F 12/0864 |
| 2021/0153255 A1* | 5/2021 | Liang | H04W 74/004 |

FOREIGN PATENT DOCUMENTS

| | | |
|---|---|---|
| CN | 103686691 A | 3/2014 |
| CN | 106538012 A | 3/2017 |
| CN | 106792998 A | 5/2017 |
| EP | 2705621 A2 | 3/2014 |
| WO | 2012153960 A2 | 11/2012 |

OTHER PUBLICATIONS

3GPP TS 36.321 V14.3.0, "3rd Generation Partnership Project; Technical Specification Group Radio Access Network; Evolved Universal Terrestrial Radio Access (E-UTRA); Medium Access Control (MAC) protocol specification (Release 14)", Jun. 2017,107 pages.

3GPP TS 38.321 V0.2.0, "3rd Generation Partnership Project;Technical Specification Group Radio Access Network; NR; Medium Access Control (MAC) protocol specification (Release 15)", Aug. 2017, 36 pages.

3GPP TS 38.331 V0.0.4, 3rd Generation Partnership Project;Technical Specification Group Radio Access Network; NR; Radio Resource Control (RRC); Protocol specification (Release 15), Jun. 2017, 22 pages.

3GPP TS 38.211 V0.1.0, "3rd Generation Partnership Project; Technical Specification Group Radio Access Network; NR; Physical channels and modulation (Release 15)", Jun. 2017, 22 pages.

3GPP TS 38.212 V0.0.0, "3rd Generation Partnership Project;Technical Specification Group Radio Access Network; NR;Multiplexing and channel coding(Release 15)", May 2017,10 pages.

3GPP TSG RAN WG1 Meeting #90, R1-1712031, "Final Report of 3GPP TSG RAN WG1 #89 v1.0.0", MCC Support, Prague, Czech Rep, Aug. 21-25, 2017, 164 pages.

3GPP TSG RAN WG1 Meeting #88, R1-1701553, "Final Report of 3GPP TSG RAN WG1 #AH1_NR v1.0.0", MCC Support,Spokane, USA, Jan. 16-20, 2017, 106 pages.

3GPP TS 36.300 V14.3.0, 3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2(Release 14), Jun. 2017, 331 pages.

TT Docomo, Inc, Status Report to TSG. New Radio (NR) Access Technology. 3GPP TSG RAN meeting #76, RP-171137, West Palm Beach, USA, Jun. 5-8, 2017, 218 pages.

* cited by examiner

METHOD FOR SENDING RANDOM ACCESS PREAMBLE, METHOD FOR RECEIVING RANDOM ACCESS PREAMBLE, AND APPARATUS

CROSS-REFERENCE TO RELATED APPLICATIONS

This application is a continuation of International Application No. PCT/CN2018/095741, filed on Jul. 16, 2018, which claims priority to Chinese Patent Application No. 201710686829.5, filed on Aug. 11, 2017. The disclosures of the aforementioned applications are hereby incorporated by reference in their entireties.

TECHNICAL FIELD

This application relates to the field of wireless communications, and in particular, to a method for sending a random access preamble, a method for receiving a random access preamble, and an apparatus.

BACKGROUND

Random access is a process in which a terminal device establishes a communications link to a network device in a mobile communications system. Non-contention based random access is a random access method used when the terminal device is in a connected mode. For example, to obtain a timing advance (TA) of a user and ensure that uplink channels of the user that are simultaneously transmitted arrive at a base station simultaneously, the terminal device needs to perform non-contention based random access. In a case of non-contention based random access, the network device allocates, to the terminal device, a preamble exclusive to the terminal device. The terminal device sends the preamble to the network device on a fixed resource, so that the network device updates a TA of the terminal device or obtains other information of the terminal based on the received preamble.

To improve resource utilization, a 5th generation (5G) mobile communications system defines a scenario in which Long Term Evolution (LTE) and new radio (NR) coexist. When LTE and NR coexist, in addition to an NR resource, an NR terminal device may also use an uplink carrier in an LTE frequency division duplex (FDD) carrier pair. For NR, a shared uplink carrier in the LTE FDD carrier pair may also be referred to as a supplementary uplink (SUL) resource of NR. In the scenario in which LTE and NR coexist, how the NR terminal device performs non-contention based random access on an NR uplink resource or an NR supplementary uplink resource is an urgent problem to be resolved currently.

SUMMARY

This application provides a method for sending a random access preamble, a method for receiving a random access preamble, and an apparatus, to resolve a problem of how a terminal device performs non-contention based random access when LTE and NR coexist.

According to a first aspect, a method for receiving a random access preamble is provided. The method includes: sending, by a network device, first information, where the first information is used to indicate a first resource or a second resource, the first information is further used to indicate a first random access preamble, and the first resource and the second resource are used to transmit the first random access preamble; and receiving, by the network device, the first random access preamble on the resource indicated by the first information.

The first resource is, for example, an NR uplink resource. The second resource is, for example, an SUL resource. Any information that can be used to indicate the NR uplink resource or the SUL resource and any information that can be used to indicate the first random access preamble may be referred to as the first information. The first information may be one piece of information, or may be a plurality of pieces of information. According to the method for receiving a random access preamble provided in this application, the network device configures, for the terminal device, a resource used for non-contention based random access, to be specific, a random access channel (RACH) of the NR uplink resource and a RACH of the SUL resource, and indicates, to the terminal device, a non-contention based random access resource that can be used. In this way, a non-contention based random access failure caused because the terminal device cannot determine a resource to be used to send a random access preamble can be prevented, or a resource waste caused when the terminal device repeatedly sends a random access preamble on a plurality of resources can be prevented, or an increase in complexity of detecting a random access preamble by the network device caused because the terminal device sends the random access preamble on any resource can be prevented.

Optionally, the first information includes first indication information and second indication information. The first indication information is used to indicate the NR uplink resource or the SUL resource. The second indication information is used to indicate the first random access preamble.

The first indication information and the second indication information may be separately carried in dedicated fields, to flexibly instruct the terminal device to perform non-contention based random access.

Optionally, before the receiving, by the network device, the first random access preamble on the resource indicated by the first indication information, the method further includes: sending, by the network device, third indication information to the terminal device. The third indication information is used to indicate that the first indication information is carried in a carrier indicator field (CIF).

In some cases, for example, when cross-carrier scheduling is not configured for the network device, the first indication information may reuse an existing field. In addition, content indicated by the third indication information is valid for a long period of time before being updated with new indication information, so that signaling overheads during non-contention based random access can be reduced.

Optionally, the first information includes second indication information. The second indication information is used to indicate the first random access preamble. There is a correspondence between the first random access preamble and the NR uplink resource or the SUL resource.

According to the method provided in this embodiment, only the second indication information is required to indicate both the first random access preamble and a resource corresponding to the first random access preamble, thereby reducing signaling overheads.

Optionally, before the receiving, by the network device, the first random access preamble on the resource indicated by the first information, the method further includes: sending, by the network device, second information to the terminal device. The second information is used to configure a correspondence between the first random access preamble and the NR uplink resource or the SUL resource.

The network device may configure a correspondence between each random access preamble and the NR uplink resource or the SUL resource. For example, the network device may configure, by using the second information, that the first random access preamble corresponds to the NR uplink resource, thereby flexibly configuring a correspondence between a random access preamble and a resource.

Optionally, the correspondence between the first random access preamble and the NR uplink resource or the SUL resource is a relationship predefined in a communication protocol.

The network device does not need to configure the correspondence by using signaling, thereby reducing signaling overheads.

Optionally, before the sending, by a network device, first information, the method further includes: sending, by the network device, a broadcast message. The broadcast message is used to configure an NR uplink resource and an SUL resource.

The network device may preconfigure the NR uplink resource and the SUL resource by using the broadcast message, so that a resource used by the terminal device to perform non-contention based random access can be indicated by using only a small quantity of bits, thereby reducing signaling overheads.

Optionally, the broadcast message includes first configuration information and second configuration information. The first configuration information is used to configure the NR uplink resource. The second configuration information is used to configure the SUL resource.

The first configuration information and the second configuration information are carried in a same message, thereby reducing signaling overheads.

Optionally, the broadcast message includes a first field. The first field includes at least two indication states. The at least two indication states are used to indicate an amount of configuration information carried in the broadcast message. The configuration information is used to configure the NR uplink resource and the SUL resource.

For example, the first field includes two indication states. One indication state is used to indicate that the broadcast message carries one piece of configuration information. The configuration information is, for example, used to configure the NR uplink resource. The other indication state is used to indicate that the broadcast message carries two pieces of configuration information. The configuration information is, for example, used to configure the NR uplink resource and the SUL resource. The network device notifies, by using the at least two indication states of the first field, the terminal device of an amount of configuration information carried in the broadcast message, so that a preamble can be prevented from being sent on an incorrect non-contention based random access resource due to a decoding error of the terminal device, thereby improving reliability of non-contention based random access.

Optionally, the broadcast message includes a second field. The second field includes at least two indication states. The at least two indication states are used to indicate whether the broadcast message carries all configuration information used for configuring a non-contention based random access resource. The non-contention based random access resource includes the NR uplink resource and the SUL resource.

For example, the second field includes two indication states. One indication state is used to indicate that the broadcast message carries all configuration information. In this case, the terminal device does not need to listen to another broadcast message, thereby reducing power consumption of the terminal device. The other indication state is used to indicate that the broadcast message carries some configuration information. In this case, the terminal device may listen to, on a corresponding transmission resource, a message carrying other configuration information, thereby reducing a probability that the terminal device misses detection of a broadcast message carrying other configuration information.

Optionally, the broadcast message includes a first broadcast message and a second broadcast message. The sending, by the network device, a broadcast message includes: sending, by the network device, the first broadcast message, where the first broadcast message includes first configuration information and fourth indication information, the first configuration information is used to configure the NR uplink resource, and the fourth indication information is used to indicate the second broadcast message; and sending, by the network device, the second broadcast message, where the second broadcast message includes second configuration information, and the second configuration information is used to configure the SUL resource.

The first configuration information and the second configuration information separately correspond to two messages, so that the network device can more flexibly configure the NR uplink resource and the SUL resource.

Optionally, the sending, by a network device, first information includes: sending, by the network device, a broadcast message including a power threshold. The power threshold is used to indicate a correspondence between receive power of the broadcast message and the NR uplink resource and SUL resource. The broadcast message is used to configure the NR uplink resource and the SUL resource. The first information includes the power threshold and second indication information. The second indication information is used to indicate the first random access preamble.

For example, when the receive power of the broadcast message is greater than or equal to the power threshold, the terminal device performs non-contention based random access by using the NR uplink resource. Alternatively, when the receive power of the broadcast message is less than or equal to the power threshold, the terminal device performs non-contention based random access by using the SUL resource. The network device may detect the first random access preamble on both the NR uplink resource and the SUL resource. According to the method provided in this embodiment, the network device may instruct the terminal device to select a resource that is more suitable for a current communication environment.

Optionally, the first indication information is carried in downlink control information (DCI), radio resource control (RRC) signaling, or a media access control (MAC) control element (CE).

Optionally, the first indication information is carried in an uplink component carrier (uplink component carrier, UL CC) field.

For example, a field (that is, a UL CC field) of 1 bit is set in the DCI. The field is used to carry the first indication information. When the value of the first indication information is 1, it indicates that the terminal device sends the random access preamble on the NR uplink resource. When the value of the first indication information is 0, it indicates that the terminal device sends the random access preamble on the SUL resource. In this way, the non-contention based random access resource can be flexibly indicated. The foregoing manner in which the DCI carries the first indication information is merely an example of description. The UL CC field may alternatively include a plurality of bits, used to indicate a plurality of indication states.

According to a second aspect, a method for sending a random access preamble is provided. The method includes: receiving, by a terminal device, first information, where the first information is used to indicate a first resource or a second resource, the first information is further used to indicate a first random access preamble, and the first resource and the second resource are used to transmit the first random access preamble; and sending, by the terminal device, the first random access preamble on the resource indicated by the first information.

The first resource is, for example, an NR uplink resource. The second resource is, for example, an SUL resource. Any information that can be used to indicate the NR uplink resource or the SUL resource and any information that can be used to indicate the first random access preamble may be referred to as the first information. The first information may be one piece of information, or may be a plurality of pieces of information. According to the method for sending a random access preamble provided in this application, a network device configures, for the terminal device, a resource used for non-contention based random access, to be specific, a RACH of the NR uplink resource and a RACH of the SUL resource, and indicates, to the terminal device, a non-contention based random access resource that can be used. In this way, a non-contention based random access failure caused because the terminal device cannot determine a resource to be used to send a random access preamble can be prevented, or a resource waste caused when the terminal device repeatedly sends a random access preamble on a plurality of resources can be prevented, or an increase in complexity of detecting a random access preamble by the network device caused because the terminal device sends the random access preamble on any resource can be prevented.

Optionally, the first information includes first indication information and second indication information. The first indication information is used to indicate the NR uplink resource or the SUL resource. The second indication information is used to indicate the first random access preamble.

The first indication information and the second indication information may be separately carried in dedicated fields, to flexibly instruct the terminal device to perform non-contention based random access.

Optionally, before the sending, by the terminal device, the first random access preamble on the resource indicated by the first indication information, the method further includes: receiving, by the terminal device, third indication information from the network device. The third indication information is used to indicate that the first indication information is carried in a carrier indicator field (CIF). A manner in which the CIF carries the third indication information is not limited. The CIF may include a plurality of bits, used to indicate a plurality of indication states.

In some cases, for example, when cross-carrier scheduling is not configured for the network device, the first indication information may reuse an existing field. In addition, content indicated by the third indication information is valid for a long period of time before being updated with new indication information, so that signaling overheads during non-contention based random access can be reduced.

Optionally, the first information includes second indication information. The second indication information is used to indicate the first random access preamble. There is a correspondence between the first random access preamble and the NR uplink resource or the SUL resource.

According to the method provided in this embodiment, only the second indication information is required to indicate both the first random access preamble and a resource corresponding to the first random access preamble, thereby reducing signaling overheads.

Optionally, before the sending, by the terminal device, the first random access preamble on the resource indicated by the first information, the method further includes: receiving, by the terminal device, second information from the network device. The second information is used to configure a correspondence between the first random access preamble and the NR uplink resource or the SUL resource.

The network device may configure a correspondence between each random access preamble and the NR uplink resource or the SUL resource. For example, the network device may configure, by using the second information, that the first random access preamble corresponds to the NR uplink resource, thereby flexibly configuring a correspondence between a random access preamble and a resource.

Optionally, the correspondence between the first random access preamble and the NR uplink resource or the SUL resource is a relationship predefined in a communication protocol.

The network device does not need to configure the correspondence by using signaling, thereby reducing signaling overheads.

Optionally, before the receiving, by a terminal device, first information, the method further includes: receiving, by the terminal device, a broadcast message. The broadcast message is used to configure an NR uplink resource and an SUL resource.

The network device may preconfigure the NR uplink resource and the SUL resource by using the broadcast message, so that a resource used by the terminal device to perform non-contention based random access can be indicated by using only a small quantity of bits, thereby reducing signaling overheads.

Optionally, the broadcast message includes first configuration information and second configuration information. The first configuration information is used to configure the NR uplink resource. The second configuration information is used to configure the SUL resource.

The first configuration information and the second configuration information are carried in a same message, thereby reducing signaling overheads.

Optionally, the broadcast message includes a first broadcast message and a second broadcast message. The receiving, by the terminal device, a broadcast message includes: receiving, by the terminal device, the first broadcast message, where the first broadcast message includes first configuration information and fourth indication information, the first configuration information is used to configure the NR uplink resource, and the fourth indication information is used to indicate the second broadcast message; and receiving, by the terminal device, the second broadcast message, where the second broadcast message includes second configuration information, and the second configuration information is used to configure the SUL resource.

The first configuration information and the second configuration information separately correspond to two messages, so that the network device can more flexibly configure the NR uplink resource and the SUL resource.

Optionally, the receiving, by a terminal device, first information includes: receiving, by the terminal device, a broadcast message including a power threshold. The power threshold is used to indicate a correspondence between receive power of the broadcast message and the NR uplink resource and SUL resource. The broadcast message is used to configure the NR uplink resource and the SUL resource. The first information includes the power threshold and second indication information. The second indication information is used to indicate the first random access preamble.

For example, when the receive power of the broadcast message is greater than or equal to the power threshold, the terminal device performs non-contention based random access by using the NR uplink resource. Alternatively, when the receive power of the broadcast message is less than or equal to the power threshold, the terminal device performs non-contention based random access by using the SUL resource. The network device may detect the first random access preamble on both the NR uplink resource and the SUL resource. According to the method provided in this embodiment, the terminal device may select a resource that is more suitable for a current communication environment.

Optionally, the first indication information is carried in DCI, RRC signaling, or a MAC CE.

Optionally, the first indication information is carried in a UL CC field.

For example, a field (that is, a UL CC field) of 1 bit is set in the DCI. The field is used to carry the first indication information. When the value of the first indication information is 1, it indicates that the terminal device sends the random access preamble on the NR uplink resource. When the value of the first indication information is 0, it indicates that the terminal device sends the random access preamble on the SUL resource. In this way, the non-contention based random access resource can be flexibly indicated. The foregoing manner in which the DCI carries the first indication information is merely an example of description. The UL CC field may alternatively include a plurality of bits, used to indicate a plurality of indication states.

According to a third aspect, an apparatus for receiving a random access preamble is provided. The apparatus can implement a function performed by the network device in the method according to the first aspect. The function may be implemented by using hardware, or may be implemented by hardware executing corresponding software. The hardware or software includes one or more units or modules corresponding to the function.

In a possible design, a structure of the apparatus includes a processor and a transceiver. The processor is configured to support the apparatus in performing the corresponding function in the method according to the first aspect. The transceiver is configured to support communication between the apparatus and another network element. The apparatus may further include a memory. The memory is coupled to the processor, and configured to store a program instruction and data that are necessary to the apparatus.

According to a fourth aspect, an apparatus for sending a random access preamble is provided. The apparatus can implement a function performed by the terminal device in the method according to the second aspect. The function may be implemented by using hardware, or may be implemented by hardware executing corresponding software. The hardware or software includes one or more units or modules corresponding to the function.

In a possible design, a structure of the apparatus includes a processor and a transceiver. The processor is configured to support the apparatus in performing the corresponding function in the method according to the second aspect. The transceiver is configured to support communication between the apparatus and another network element. The apparatus may further include a memory. The memory is coupled to the processor, and configured to store a program instruction and data that are necessary to the apparatus.

According to a fifth aspect, this application further provides a network system. The network system includes the apparatus for receiving a random access preamble according to the third aspect and the apparatus for sending a random access preamble according to the fourth aspect.

According to a sixth aspect, a computer readable storage medium is provided. The computer readable storage medium stores computer program code. When the computer program code is executed by a processing unit or a processor, a network device is caused to perform the method according to the first aspect.

According to a seventh aspect, a computer readable storage medium is provided. The computer readable storage medium stores computer program code. When the computer program code is executed by a processing unit or a processor, a terminal is caused to perform the method according to the second aspect.

According to an eighth aspect, a communications chip is provided. The communications chip stores an instruction. When the instruction runs on a network device, the communications chip is caused to perform the method according to the first aspect.

According to a ninth aspect, a communications chip is provided. The communications chip stores an instruction. When the instruction runs on a terminal device, the communications chip is caused to perform the method according to the second aspect.

According to a tenth aspect, a computer program product is provided. The computer program product includes computer program code. When the computer program code is run by a communications unit or a transceiver, and a processing unit or a processor of a network device, the network device is caused to perform the method according to the first aspect.

According to an eleventh aspect, a computer program product is provided. The computer program product includes computer program code. When the computer program code is run by a communications unit or a transceiver, and a processing unit or a processor of a terminal device, the terminal device is caused to perform the method according to the second aspect.

DETAILED DESCRIPTION OF ILLUSTRATIVE EMBODIMENTS

The following describes technical solutions of this application with reference to the accompanying drawings.

Figure 1:
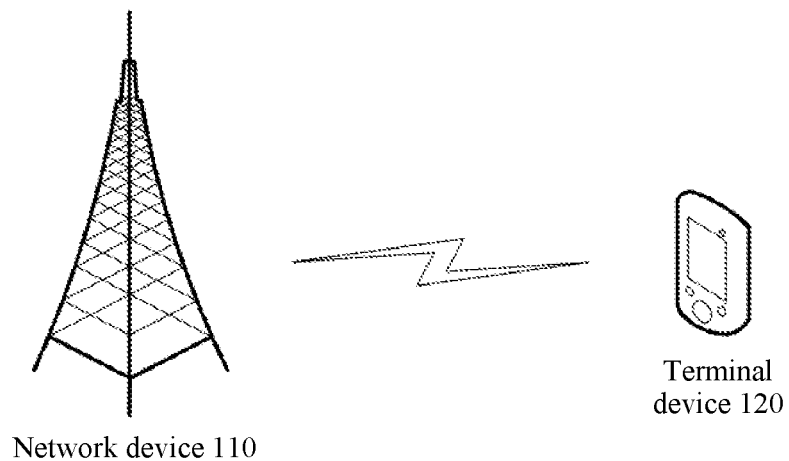
FIG. 1 shows a communications system applicable to this application.

FIG. 1 shows a communications system 100 applicable to this application. The communications system 100 includes a network device 110 and a terminal device 120. The network device no communicates with the terminal device 120 by using a wireless network. When the terminal device 120 sends information, a wireless communication module of the terminal device 120 may obtain information bits to be sent to the network device no by using a channel. These information bits are, for example, information bits that are generated by a processing module of the terminal device 120, or received from another device, or stored in a storage module of the terminal device 120.

The terminal device in this application may also be referred to as an access terminal, user equipment (UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a handheld device with a wireless communication function, a computing device, another processing device connected to a wireless modem, an in-vehicle device, a wearable device, or user equipment in a 5G communications system.

The network device may be a base transceiver station (BTS) in a Code Division Multiple Access (CDMA) system, or may be a NodeB (NB) in a Wideband Code Division Multiple Access (WCDMA) system, or may be an evolved NodeB (eNB) in a Long Term Evolution (LTE) system, or may be a gNB in a 5G communications system. The base station is merely an example of description. The network device may alternatively be a relay station, an access point, an in-vehicle device, a wearable device, or another type of device.

The above communications system applicable to this application is merely an example of description. A communications system applicable to this application is not limited thereto. For example, the communications system may alternatively include other quantities of network devices and terminal devices.

For ease of understanding of this application, before methods for sending and receiving feedback information provided in this application are described, concepts in this application are first briefly described.

An SUL resource is a transmission resource in which only an uplink resource is used for a current communications standard. For example, for a carrier, only an uplink frequency domain resource is used for transmission. For example, in a 5G mobile communications system, a carrier A is used only for uplink transmission of NR. The carrier is not used for downlink transmission. Alternatively, the carrier is used for downlink transmission of an LTE communications system and is not used for downlink transmission of an NR communications system. In this case, the carrier A is an SUL resource.

The terminal device needs to perform random access during initial access to a cell, to obtain a unique identifier of the terminal device in the cell. The random access performed by the terminal device during initial access to the cell is also referred to as contention based random access.

After accessing the cell, in some cases, the terminal device also needs to perform random access. For example, if the terminal device is in an RRC connected mode, when the terminal device needs to reply with an acknowledgement or a negative acknowledgement for received downlink data, uplink and downlink communications links are in an asynchronous state. For another example, if the terminal device is in an RRC connected mode, the network device needs to obtain a timing advance of the terminal device. For still another example, after performing cell handover, the terminal device needs to establish uplink and downlink synchronization with a new cell.

In all the foregoing three cases, the terminal device needs to perform random access. Different from the random access during initial access to the cell, the random access in the foregoing three cases is non-contention based random access. To be specific, the terminal device performs random access based on a unique random access preamble allocated by the network device, and does not use a same random access preamble with another terminal device. In this application, for brevity, the "random access preamble" is sometimes briefly referred to as a "preamble".

Figure 2:
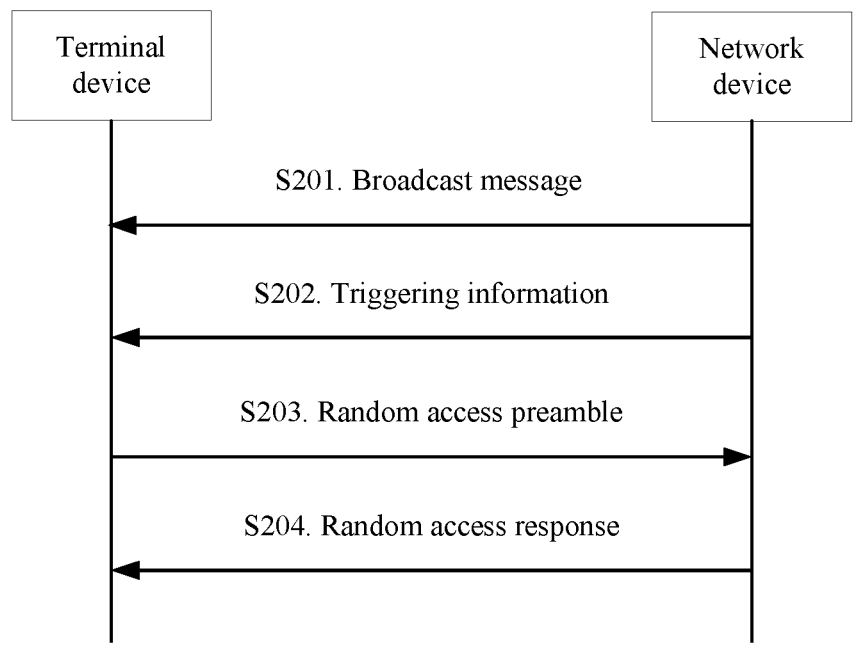
FIG. 2 is a schematic flowchart of a non-contention based random access method according to this application.

FIG. 2 is a schematic flowchart of a non-contention based random access method according to this application. As shown in FIG. 2, the method includes the following steps.

S201. A network device sends a broadcast message, where the broadcast message is used to configure an NR uplink resource and an SUL resource, and the NR uplink resource and the SUL resource are used to send a random access preamble.

For example, the broadcast message includes a time domain parameter, a frequency domain parameter, and a code domain parameter that are used to configure a physical random access channel (PRACH) in the foregoing two types of resources. The time domain parameter may be a system frame, a subframe, a timeslot, a symbol, or a period corresponding to the PRACH. The frequency domain parameter may be a start resource block (RB) of the PRACH, or a quantity of RBs occupied by the PRACH. The code domain parameter may be preamble format information (a sequence length, a subcarrier spacing size, and occupied duration of a preamble), an orthogonal cover code, or a cyclic shift. In addition, the broadcast message may be a system information block (SIB) 2, or may be remaining minimum system information (RMSI). This is not limited in this application.

For another example, the network device may configure the NR uplink resource and the SUL resource by using a first broadcast message and a second broadcast message. The first broadcast message includes a PRACH parameter of the NR uplink resource. The first broadcast message further includes indication information (e.g., fourth indication information) that is used to indicate whether there is another radio resource configuration. When the indication information indicates that there is another radio resource configuration, the second broadcast message is used to configure a PRACH parameter of the SUL resource. The first broadcast message is, for example, a SIB 2 or RMSI. The second broadcast message is, for example, a SIB 3.

In S201, when the broadcast message sent by the network device includes power threshold information, the terminal device determines, based on a relationship between reference signal received power (RSRP) of a downlink carrier and a threshold indicated by the power threshold information, a resource to be used to send a preamble. If the RSRP of the downlink carrier is greater than or equal to the threshold, the terminal device determines to use a first resource parameter set. If the RSRP of the downlink carrier is less than the threshold, the terminal device uses a second resource parameter set. The first resource parameter set and the second resource parameter set correspond to the NR uplink resource and the SUL resource. The network device may indicate, in the broadcast message, an order in which the two types of resources are configured.

In S201, when the broadcast message sent by the network device does not include power threshold information, the terminal device may determine, based on first indication information sent by the network device, a resource to be used to send a preamble, or the terminal device may send a preamble twice on the NR uplink resource and the SUL resource. The network device sends an RAR to the terminal device on the NR uplink resource or the SUL resource. In this way, the network device does not need to send the first indication information to the terminal device, thereby reducing signaling overheads.

It should be noted that, the broadcast message sent by the network device may include a plurality of resource configuration parameter sets. Only one resource configuration parameter set includes a configuration parameter of the downlink carrier, so that the terminal device receives triggering information by using the downlink carrier. The plurality of resource configuration parameter sets may further include an uplink bandwidth parameter and a frequency parameter. The uplink bandwidth parameter may be indicated by enumerated types. One enumerated value represents one specific bandwidth size. An uplink frequency parameter may be, for example, bit information used to indicate a frequency. A bit code used by an absolute frequency is related to a bandwidth definition and a raster size.

In addition, the broadcast message may further include a subcarrier shift information element. The subcarrier shift information element is used to configure a shift mode of a frequency domain resource of the SUL resource. The shift mode includes the following mode 1. The shift mode further includes at least one of the following mode 2, mode 3, and mode 4. The mode 1 indicates that no shift is performed. The mode 2 indicates that a subcarrier baseband is shifted by 7.5 kHz. The mode 3 indicates that a subcarrier radio frequency is shifted by 7.5 kHz. The mode 4 indicates that a raster is shifted by 7.5 kHz. The subcarrier shift information element indicates at least one of the foregoing four modes. For example, when a subcarrier spacing of the SUL resource is configured as 15 kHz, that a baseband is shifted by 7.5 Hz means that a baseband signal is generated based on an offset of ½ subcarrier, that is, $e^{j2\pi(k+1/2)t}$. That an uplink resource radio frequency is shifted by 7.5 kHz means that a baseband signal is multiplied by a carrier frequency and 7.5 kHz when the baseband signal is modulated to an intermediate radio frequency, that is, $e^{2\pi(f_0+7.5)t}$. That a raster is shifted by 7.5 kHz means that a frequency corresponding to a frequency number 13000 is 1920 MHz plus 7.5 kHz.

S202. The network device sends triggering information to the terminal device, where the triggering information may be, for example, DCI or RRC signaling.

When the triggering information is the DCI, the network device may trigger, by using DCI in a format (for example, a DCI format 1A), the terminal device to initiate random access. The DCI in the format includes the following information: an index of a preamble used in random access, a type of a resource used for sending a preamble, and index information of a RACH resource that is in a radio frame and that can be used to send a dedicated preamble. A preamble indicated by the index of the preamble is a dedicated preamble allocated by the network device to the terminal device. Another terminal device does not use the preamble to perform random access. The type of the resource used for sending a preamble is used to instruct the terminal device to use the NR uplink resource or the SUL resource. For example, the network device may instruct, by using a UL CC index, the terminal device to use the NR uplink resource or the SUL resource. A PRACH mask index is used to indicate a RACH resource index that is allocated to the terminal device and that is used to transmit the foregoing dedicated preamble. For example, the PRACH mask index is equal to 3. As can be learned by looking up Table 7.3.1 in the technical specification (TS) 36.321 of the 3rd Generation Partnership Project (3GPP), an index of the RACH resource corresponding to the index is 2. To be specific, the preamble needs to be sent on a third PRACH in a system frame.

Optionally, the network device may add a field (e.g., a UL CC field) of 1 bit to the DCI to carry the first indication information that is used to indicate an uplink resource used by the preamble. For example, when the field is "1", it indicates that the terminal device uses the NR uplink resource to send the preamble. When the field is "0", it indicates that the terminal device uses the SUL resource to send the preamble.

Optionally, when cross-carrier scheduling is not configured for the network device, the network device may use a CIF field to indicate an uplink resource used by the preamble. For example, the network device may indicate, by using a field (e.g., third indication information) in RRC signaling or higher layer signaling, that a CIF field of the DCI is used to carry the third indication information, to indicate the uplink resource used by the preamble. Content indicated by the third indication information is valid for a long period of time before being updated with new indication information, so that signaling overheads during non-contention based random access can be reduced. A manner in which the CIF carries the third indication information is not limited. The CIF may include a plurality of bits, used to indicate a plurality of indication states.

Optionally, a communication protocol may predefine a correspondence between a random access preamble and each resource. For example, a non-contention based random access preamble on the NR uplink resource may be configured by using the broadcast message. A quantity of non-contention based random access preambles is N, and indexes are respectively 0 to N−1. A non-contention based random access preamble on the SUL resource is configured. A quantity of non-contention based random access preambles is M, and indexes are respectively N to N+M−1. The communication protocol predefines that the preambles whose indexes are 0 to N−1 correspond to the NR uplink resource, and preambles whose indexes are N to N+M−1 correspond to the SUL resource. If a first preamble index indicated by the second indication information is one of 0 to N−1, the terminal device may determine to send a first random access preamble on the NR uplink resource. Similarly, if a preamble index indicated by the second indication information is one of N to N+M−1, the terminal device determines to send a first random access preamble on the SUL resource. In other words, information used to indicate a random access preamble and information used to indicate a non-contention based random access resource reuse a same field, thereby reducing signaling overheads during non-contention based random access.

For another example, the network device explicitly or implicitly configures 10 non-contention based random access preambles for the NR uplink resource, the network device explicitly or implicitly configures 20 non-contention based random access preambles for the SUL resource, and remaining preambles numbered 30 to 63 are used for contention based random access. Based on a correspondence configured by a network, for example, '0' in a 1-bit field in broadcast information indicates that a number of a non-contention based preamble of the NR uplink resource is ahead of a number of a non-contention preamble of the SUL resource, an optional numbering manner is: non-contention based random access preambles numbered 0 to 9 are indicated to correspond to the 10 non-contention based random access preambles on the NR uplink resource, and non-contention based random access preambles numbered 10 to 29 are indicated to correspond to the 20 non-contention based random access preambles on the SUL resource. When an index of a preamble sent by the network device is 2, the terminal device sends a preamble numbered 2 to the network device on the NR uplink resource. When an index of a preamble sent by the network device is 11, the terminal device sends a preamble numbered 11 on the SUL resource. The network device receives, on the corresponding resource, the preamble sent by the terminal device. A specific joint numbering manner is not limited to the foregoing examples.

When the triggering information is RRC signaling, the network device may indicate, by using a ra-PreambleIndex field in the RRC signaling, the preamble used by the terminal device, and indicate, by using a ra-PRACH-MaskIndex field in the RRC signaling, a PRACH resource used for sending the preamble. A specific implementation process is similar to the foregoing method for triggering, by using the DCI, the terminal device to send a preamble. For brevity, details are not described again.

The foregoing embodiment is merely an example for description. This application is not limited thereto. For example, the triggering information may alternatively be a MAC CE.

The method 200 further includes the following steps.

S203. The terminal device initiates random access based on a preamble and a PRACH resource that are indicated by the triggering information, and sends the preamble to the network device.

S204. The network device performs blind detection on the preamble on a PRACH, and if the network device detects the preamble, the network device subsequently sends a random access response (RAR) on a physical downlink shared channel (PDSCH) within a random access response window.

The RAR includes a random access radio network temporary identifier (RA-RNTI), an index corresponding to the preamble in S203, and a TA. The RAR may further include other information.

The method shown in FIG. 2 is merely an example for description. The non-contention based access method provided in this application is not limited thereto. According to the method for receiving a random access preamble provided in FIG. 2, the network device preconfigures, for the terminal device, a resource used for non-contention based random access, and indicates, to the terminal device when the terminal device needs to perform non-contention based random access, a resource that can be used. In this way, a non-contention based random access failure caused because the terminal device cannot determine a resource to be used to send a random access preamble can be prevented, or an increase in complexity of detecting a random access preamble by the network device caused because the terminal device sends the random access preamble on any resource can be prevented.

Examples of the method for sending a random access preamble and the method for receiving a random access preamble provided in this application are described in detail above. It may be understood that, to implement the foregoing functions, the terminal device and the network device include corresponding hardware structures and/or software modules for performing the functions. A person of ordinary skill in the art should easily be aware that, in combination with units and algorithms steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the network device or the like may be divided into functional units based on the foregoing method example. For example, function unit division may be performed corresponding to the functions, or two or more functions may be integrated into one processing unit. The integrated unit may be implemented in a form of hardware, or may be implemented in a form of a software functional unit. It should be noted that the division of the units in this application is schematic and is merely a logical function division. In actual implementation, there may be another division manner.

Figure 3:
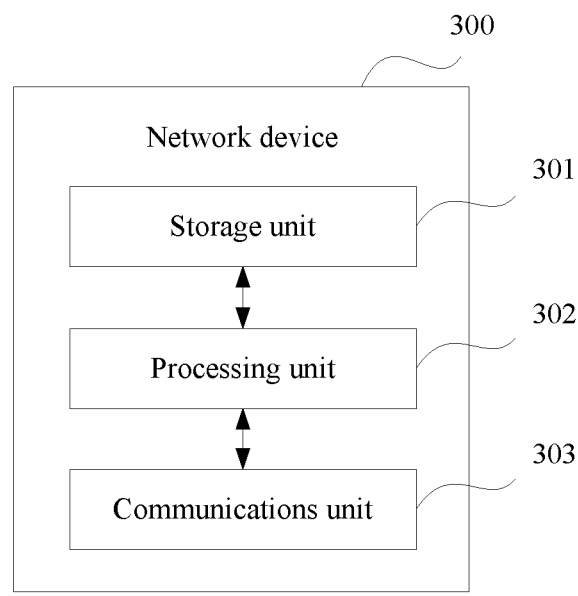
FIG. 3 is a schematic diagram of a possible network device according to this application.

When an integrated unit is used, FIG. 3 is a possible schematic structural diagram of a network device in the foregoing embodiment. A network device 300 includes a processing unit 302 and a communications unit 303. The processing unit 302 is configured to control and manage an action of the network device 300. For example, the processing unit 302 is configured to support the network device 300 in performing S201 in FIG. 2 and/or another process of the technology described in this specification. The communications unit 303 is configured to support the network device 300 in communicating with another network entity, for example, communicating with a terminal device. The network device 300 may further include a storage unit 301, configured to store program code and data that are of the network device 300.

For example, the processing unit 302 controls the communications unit 303 to perform the following steps: sending a broadcast message, where the broadcast message is used to configure an NR uplink resource and an SUL resource, and the NR uplink resource and the SUL resource are used to send a random access preamble; sending first indication information and second indication information to a terminal device, where the first indication information is used to indicate the NR uplink resource or the SUL resource, and the second indication information is used to indicate a first random access preamble; and receiving the first random access preamble on the resource indicated by the first indication information.

The processing unit 302 may be a processor or a controller, for example, may be a central processing unit (CPU), a general purpose processor, a digital signal processor (DSP), an application-specific integrated circuit (ASIC), a field programmable gate array (FPGA) or another programmable logical device, a transistor logic device, a hardware component, or any combination thereof. The processing unit may implement or execute various examples of logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 303 may be a transceiver, a transceiver circuit, or the like. The storage unit 301 may be a memory.

Figure 4:
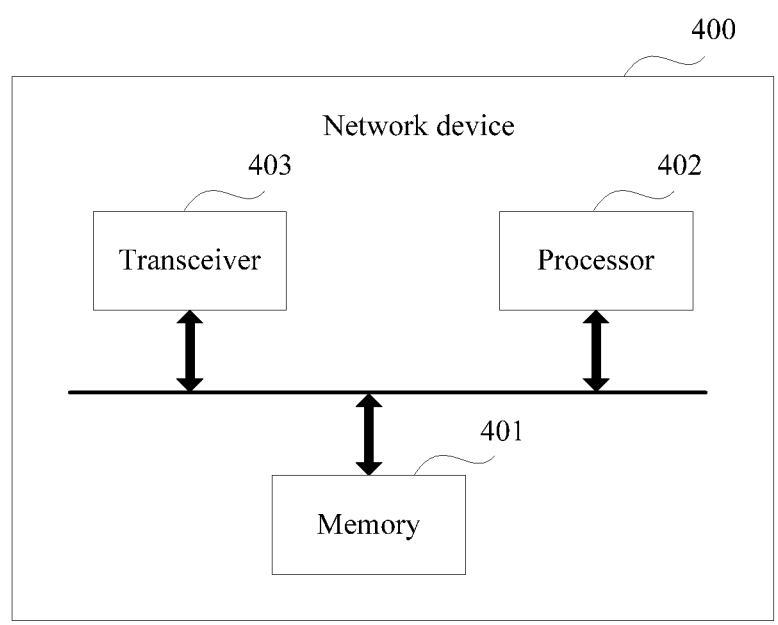
FIG. 4 is a schematic diagram of another possible network device according to this application.

When the processing unit 302 is a processor, the communications unit 303 is a transceiver, and the storage unit 301 is a memory, the network device in this application may be a network device 400 shown in FIG. 4.

Referring to FIG. 4, the network device 400 includes a processor 402, a transceiver 403, and a memory 401. The transceiver 403, the processor 402, and the memory 401 may communicate with one another by using an internal connection path, to transfer control and/or data signals.

A person skilled in the art can clearly understand that for convenience and brevity of description, for specific working processes of the apparatus and units described above, refer to the corresponding processes in the foregoing method embodiments, and no further details are provided herein.

The network device 300 and the network device 400 provided in this application each preconfigure, for the terminal device, a resource used for non-contention based random access, and indicate, to the terminal device when the terminal device needs to perform non-contention based random access, a resource that can be used. In this way, a non-contention based random access failure caused because the terminal device cannot determine a resource to be used to send a random access preamble can be prevented, or a resource waste caused when the terminal device repeatedly sends a random access preamble on a plurality of resources can be prevented, or an increase in complexity of detecting a random access preamble by the network device because the terminal device sends the random access preamble on any resource can be prevented.

Figure 5:
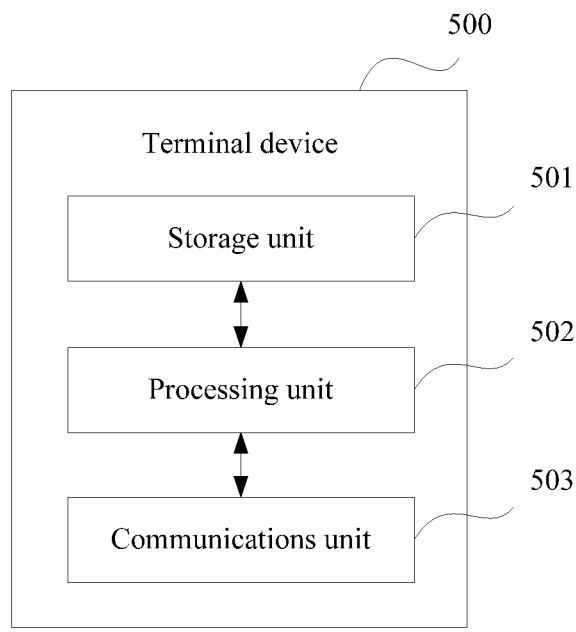
FIG. 5 is a schematic diagram of a possible terminal device according to this application.

When an integrated unit is used, FIG. 5 is a possible schematic structural diagram of a terminal device in the foregoing embodiment. A terminal device 500 includes a processing unit 502 and a communications unit 503. The processing unit 502 is configured to control and manage an action of the terminal device 500. For example, the processing unit 502 is configured to support the terminal device 500 in performing S203 in FIG. 2 and/or another process of the technology described in this specification. The communications unit 503 is configured to support the terminal device 500 in communicating with another terminal entity, for example, communicating with a network device. The terminal device 500 may further include a storage unit 501, configured to store program code and data that are of the terminal device 500.

For example, the processing unit 502 controls the communications unit 503 to perform the following steps: receiving a broadcast message from a network device, where the broadcast message is used to configure an NR uplink resource and an SUL resource, and the NR uplink resource and the SUL resource are used to send a random access preamble; receiving first indication information and second indication information from the network device, where the first indication information is used to indicate the NR uplink resource or the SUL resource, and the second indication information is used to indicate a first random access preamble; and sending the first random access preamble to the network device on the resource indicated by the first indication information.

The processing unit 502 may be a processor or a controller, for example, may be a CPU, a general purpose processor, a DSP, an ASIC, an FPGA or another programming logical device, a transistor logic device, a hardware component, or any combination thereof. The processing unit may implement or execute various examples of logical blocks, modules, and circuits described with reference to content disclosed in this application. Alternatively, the processor may be a combination of processors implementing a computing function, for example, a combination of one or more microprocessors, or a combination of a DSP and a microprocessor.

The communications unit 503 may be a transceiver, a transceiver circuit, or the like. The storage unit 501 may be a memory.

Figure 6:
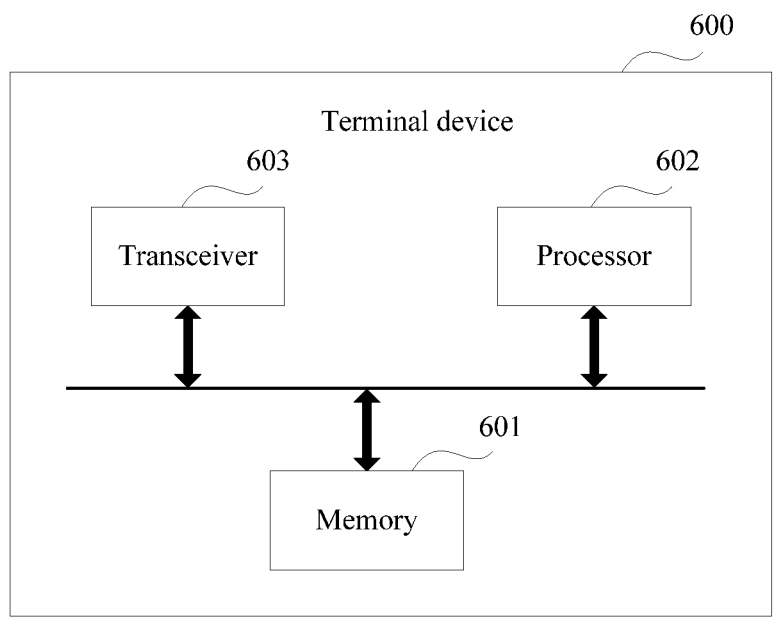
FIG. 6 is a schematic diagram of another possible terminal device according to this application.

When the processing unit 502 is a processor, the communications unit 503 is a transceiver, and the storage unit 501 is a memory, the terminal device in this application may be a terminal device 600 shown in FIG. 6.

Referring to FIG. 6, the terminal device 600 includes a processor 602, a transceiver 603, and a memory 601. The transceiver 603, the processor 602, and the memory 601 may communicate with one another by using an internal connection path, to transfer control and/or data signals.

A person skilled in the art can clearly understand that for convenience and brevity of description, for specific working processes of the apparatus and units described above, refer to the corresponding processes in the foregoing method embodiments, and no further details are provided herein.

The terminal device 500 and the terminal device 600 provided in this application each determine, based on the broadcast message sent by the network device, a resource used for non-contention based random access, and determine, based on the first indication information sent by the network device, a resource that can be used. In this way, a non-contention based random access failure caused because the terminal device cannot determine a resource to be used to send a random access preamble can be prevented, or a resource waste caused when the terminal device repeatedly sends a random access preamble on a plurality of resources can be prevented, or an increase in complexity of detecting a random access preamble by the network device because the terminal device sends the random access preamble on any resource can be prevented.

It should be understood that the transceiver may include a transmitter and a receiver. The transceiver may further include an antenna. There may be one or more antennas. The memory may be an independent device, or may be integrated into the processor. The devices or some devices may be integrated into a chip for implementation, for example, integrated into a baseband chip for implementation.

The network device or the terminal device in the apparatus embodiment completely corresponds to the network device or the terminal device in the method embodiment. A corresponding module performs a corresponding step. For example, a sending module or a transmitter performs a sending step in the method embodiment, and a receiving module or a receiver performs a receiving step in the method embodiment. Steps other than the sending and receiving steps may be performed by a processing module or a processor. For a function of a specific module, refer to the corresponding method embodiment. Details are not described again.

It should be understood that sequence numbers of the foregoing processes do not mean execution sequences in the embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in a terminal device and a network device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions in this application are all or partially generated. The computer may be a general-purpose computer, a dedicated computer, a computer network, or another programmable apparatus. The computer instructions may be stored in or transmitted by a computer readable storage medium. The computer instructions may be transmitted from a website, computer, server, or data center to another website, computer, server, or data center in a wired manner (for example, a coaxial cable, an optical fiber, or a digital subscriber line (DSL)) or in a wireless (such as infrared, wireless, or microwave) manner. The computer readable storage medium may be any usable medium accessible to a computer, or a data storage device such as a server or a data center integrated with one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made based on the technical solutions of this application shall fall within the protection scope of this application.

What is claimed is:

1. A method, comprising:
   receiving, by an apparatus, a broadcast message from a network device, wherein the broadcast message configures a new radio (NR) uplink resource and a supplementary uplink (SUL) resource;
   receiving, by the apparatus, first indication information and second indication information from the network device, wherein the first indication information indicates a resource, the resource is the NR uplink resource or the SUL resource, and the second indication information indicates a random access preamble, wherein third indication information received from the network device indicates that the first indication information is carried in a carrier indicator field (CIF); and
   sending, by the apparatus, the random access preamble to the network device on the resource indicated by the first indication information.

2. The method according to claim 1, wherein the first indication information occupies a third field, and wherein:
   when the third field is in a first state, the first indication information indicates the NR uplink resource; or
   when the third field is in a second state, the first indication information indicates the SUL resource.

3. The method according to claim 1, wherein the first indication information and the second indication information are comprised in downlink control information (DCI).

4. The method according to claim 1, wherein the broadcast message comprises a first field, the first field comprises at least two indication states, the at least two indication states indicates an amount of configuration information carried in the broadcast message, and the configuration information configures the NR uplink resource and the SUL resource.

5. The method according to claim 1, wherein the broadcast message comprises a second field, the second field comprises at least two indication states, the at least two indication states indicates whether the broadcast message carries all configuration information for configuring a non-contention based random access resource, and the non-contention based random access resource comprises the NR uplink resource and the SUL resource.

6. An apparatus, comprising:
   a processor; and
   a transceiver, wherein the processor is configured to control the transceiver to:
     send a broadcast message, wherein the broadcast message configures a new radio (NR) uplink resource and a supplementary uplink (SUL) resource;
     send first indication information and second indication information to a terminal device, wherein the first indication information indicates a resource, the resource is the NR uplink resource or the SUL resource, and the second indication information indicates a random access preamble, wherein third indication information sent to the terminal device indicates that the first indication information is carried in a carrier indicator field (CIF); and
     receive the random access preamble on the resource indicated by the first indication information.

7. The apparatus according to claim 6, wherein the first indication information occupies a third field, and wherein:
   when the third field is in a first state, the first indication information indicates the NR uplink resource; or
   when the third field is in a second state, the first indication information indicates the SUL resource.

8. The apparatus according to claim 6, wherein the first indication information and the second indication information are comprised in downlink control information (DCI).

9. The apparatus according to claim 6, wherein the broadcast message comprises a first field, the first field comprises at least two indication states, the at least two indication states indicates an amount of configuration information carried in the broadcast message, and the configuration information configures the NR uplink resource and the SUL resource.

10. The apparatus according to claim 6, wherein the broadcast message comprises a second field, the second field comprises at least two indication states, the at least two indication states are indicates whether the broadcast message carries all configuration information for configuring a non-contention based random access resource, and the non-contention based random access resource comprises the NR uplink resource and the SUL resource.

11. An apparatus, comprising:
a processor; and
a transceiver, wherein the processor is configured to control the transceiver to:
receive a broadcast message from a network device, wherein the broadcast message configures a new radio (NR) uplink resource and a supplementary uplink (SUL) resource;
receive first indication information and second indication information from the network device, wherein the first indication information indicates a resource, the resource is the NR uplink resource or the SUL resource, and the second indication information indicates a random access preamble, wherein third indication information received from the network device indicates that the first indication information is carried in a carrier indicator field (CIF); and
send the random access preamble to the network device on the resource indicated by the first indication information.

12. The apparatus according to claim 11, wherein the first indication information occupies a third field, and wherein:
when the third field is in a first state, the first indication information indicates the NR uplink resource; or
when the third field is in a second state, the first indication information indicates the SUL resource.

13. The apparatus according to claim 11, wherein the first indication information and the second indication information are comprised in downlink control information (DCI).

14. The apparatus according to claim 11, wherein the broadcast message comprises a first field, the first field comprises at least two indication states, the at least two indication states indicates an amount of configuration information carried in the broadcast message, and the configuration information configures the NR uplink resource and the SUL resource.

15. The apparatus according to claim 11, wherein the broadcast message comprises a second field, the second field comprises at least two indication states, the at least two indication states indicates whether the broadcast message carries all configuration information for configuring a non-contention based random access resource, and the non-contention based random access resource comprises the NR uplink resource and the SUL resource.

* * * * *